US010467061B2

(12) United States Patent
Quinn et al.

(10) Patent No.: US 10,467,061 B2
(45) Date of Patent: Nov. 5, 2019

(54) SYSTEM AND METHOD FOR RESOURCE OVERRIDING IN A MULTITENANT APPLICATION SERVER ENVIRONMENT

(71) Applicant: ORACLE INTERNATIONAL CORPORATION, Redwood Shores, CA (US)

(72) Inventors: Timothy Quinn, Lake Forest, IL (US); Joseph Di Pol, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 435 days.

(21) Appl. No.: 14/865,923

(22) Filed: Sep. 25, 2015

(65) Prior Publication Data

US 2016/0094478 A1 Mar. 31, 2016

Related U.S. Application Data

(60) Provisional application No. 62/055,570, filed on Sep. 25, 2014, provisional application No. 62/056,445, filed on Sep. 26, 2014.

(51) Int. Cl.
*G06F 15/16* (2006.01)
*G06F 9/50* (2006.01)
*H04L 12/915* (2013.01)

(52) U.S. Cl.
CPC .......... *G06F 9/5077* (2013.01); *H04L 47/786* (2013.01)

(58) Field of Classification Search
CPC .................................................... H04L 47/786
(Continued)

(56) References Cited

U.S. PATENT DOCUMENTS 8,326,876 B1 12/2012 Venkataraman et al.
8,621,178 B1 * 12/2013 Lazar .................. G06F 12/0223
711/117
(Continued)

FOREIGN PATENT DOCUMENTS

CN 101639835 2/2010
CN 102170457 8/2011
(Continued)

OTHER PUBLICATIONS

Chinese Patent Office, Office Action dated Jul. 20, 2018, 8 pages.

*Primary Examiner* — Kevin T Bates
*Assistant Examiner* — Clarence D McCray
(74) *Attorney, Agent, or Firm* — Tucker Ellis LLP

(57) ABSTRACT

In accordance with an embodiment, described herein is a system and method for providing a partition file system in a multitenant application server environment. The system enables application server components to work with partition-specific files for a given partition, instead of or in addition to domain-wide counterpart files. The system also allows the location of some or all of a partition-specific storage to be specified by higher levels of the software stack. In accordance with an embodiment, also described herein is a system and method for resource overriding in a multitenant application server environment, which provides a means for administrators to customize, at a resource group level, resources that are defined in a resource group template referenced by a partition, and to override resource definitions for particular partitions.

20 Claims, 12 Drawing Sheets

(58) Field of Classification Search
USPC .......................................................... 709/226
See application file for complete search history.

(56) References Cited

U.S. PATENT DOCUMENTS

| | | | |
|---|---|---|---|
| 2010/0325624 A1* | 12/2010 | Bartolo | G06F 8/61 |
| | | | 717/176 |
| 2011/0213870 A1* | 9/2011 | Cai | H04L 67/10 |
| | | | 709/223 |
| 2012/0072597 A1 | 3/2012 | Teather et al. | |
| 2013/0103938 A1* | 4/2013 | Datta | G06F 21/57 |
| | | | 713/100 |
| 2014/0075565 A1* | 3/2014 | Srinivasan | G06Q 10/06315 |
| | | | 726/26 |
| 2015/0207758 A1 | 7/2015 | Mordani et al. | |
| 2015/0296030 A1* | 10/2015 | Maes | G06F 9/5072 |
| | | | 715/736 |
| 2015/0370549 A1 | 12/2015 | Zhang et al. | |
| 2015/0370608 A1 | 12/2015 | Dipol et al. | |
| 2015/0372883 A1 | 12/2015 | Lam et al. | |
| 2015/0372887 A1 | 12/2015 | Inamdar et al. | |
| 2015/0372936 A1 | 12/2015 | Kasso et al. | |
| 2015/0372937 A1 | 12/2015 | Lai et al. | |
| 2015/0373004 A1 | 12/2015 | Hopkins et al. | |
| 2015/0373097 A1 | 12/2015 | Konkus et al. | |
| 2015/0373098 A1 | 12/2015 | Mordani et al. | |
| 2015/0373099 A1 | 12/2015 | Dipol et al. | |
| 2015/0373117 A1 | 12/2015 | Gleyzer et al. | |
| 2015/0378641 A1 | 12/2015 | Patel et al. | |
| 2015/0378938 A1 | 12/2015 | Patel et al. | |
| 2016/0013983 A1 | 1/2016 | Lu et al. | |
| 2016/0014038 A1* | 1/2016 | Thyagarajan | H04L 47/70 |
| | | | 709/226 |
| 2016/0014191 A1 | 1/2016 | Liu et al. | |
| 2016/0014212 A1 | 1/2016 | Zhang et al. | |
| 2016/0020949 A1 | 1/2016 | Mares et al. | |
| 2016/0085543 A1 | 3/2016 | Islam et al. | |
| 2016/0088108 A1 | 3/2016 | Felts et al. | |
| 2016/0092278 A1 | 3/2016 | Quinn et al. | |
| 2016/0092319 A1 | 3/2016 | Parkinson et al. | |
| 2016/0092342 A1 | 3/2016 | Inamdar et al. | |
| 2016/0094385 A1 | 3/2016 | Bower et al. | |
| 2016/0094403 A1 | 3/2016 | Somogyi et al. | |
| 2016/0094404 A1 | 3/2016 | Kasso et al. | |
| 2016/0094405 A1 | 3/2016 | Barnes et al. | |
| 2016/0094406 A1 | 3/2016 | Phan et al. | |
| 2016/0094407 A1 | 3/2016 | Parkinson et al. | |
| 2016/0094408 A1 | 3/2016 | Segu | |
| 2016/0094473 A1 | 3/2016 | Mordani et al. | |
| 2016/0094474 A1 | 3/2016 | Sahoo et al. | |
| 2016/0094484 A1 | 3/2016 | Mordani et al. | |
| 2016/0094486 A1 | 3/2016 | Sahoo et al. | |
| 2016/0094498 A1 | 3/2016 | Xiao et al. | |
| 2016/0094510 A1 | 3/2016 | Xiao et al. | |
| 2016/0094582 A1 | 3/2016 | Watson et al. | |
| 2016/0094583 A1 | 3/2016 | Bower | |
| 2016/0094624 A1* | 3/2016 | Mordani | H04L 47/76 |
| | | | 709/203 |
| 2016/0094625 A1 | 3/2016 | Sengodan et al. | |
| 2016/0094626 A1 | 3/2016 | Bajaj et al. | |
| 2016/0094627 A1 | 3/2016 | Subramanyam et al. | |
| 2016/0094635 A1 | 3/2016 | Kannan et al. | |
| 2016/0094647 A1 | 3/2016 | Mordani et al. | |
| 2016/0142506 A1 | 5/2016 | Sahoo et al. | |
| 2016/0231998 A1 | 8/2016 | Islam et al. | |
| 2016/0328268 A1 | 11/2016 | Islam et al. | |
| 2017/0017494 A1 | 1/2017 | Patel et al. | |
| 2017/0019467 A1 | 1/2017 | Inamdar et al. | |
| 2017/0019485 A1 | 1/2017 | Dorr et al. | |
| 2017/0034071 A1 | 2/2017 | Sidde et al. | |
| 2017/0116041 A1 | 4/2017 | Nanjudaswamy | |
| 2017/0118137 A1 | 4/2017 | Nanjudaswamy | |
| 2017/0126742 A1 | 5/2017 | Hopkins et al. | |
| 2017/0192772 A1 | 7/2017 | Islam et al. | |

FOREIGN PATENT DOCUMENTS

| | | |
|---|---|---|
| CN | 102333115 | 1/2012 |
| CN | 102571821 | 7/2012 |
| CN | 102571916 | 7/2012 |
| CN | 102609271 | 7/2012 |
| CN | 102932404 | 2/2013 |
| CN | 102932405 | 2/2013 |
| CN | 103455512 | 12/2013 |

\* cited by examiner

SYSTEM AND METHOD FOR RESOURCE OVERRIDING IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Applications "SYSTEM AND METHOD FOR PROVIDING A PARTITION FILE SYSTEM IN A MULTITENANT APPLICATION SERVER ENVIRONMENT", Application No. 62/055,570, filed Sep. 25, 2014; and "SYSTEM AND METHOD FOR RESOURCE OVERRIDING IN A MULTITENANT APPLICATION SERVER ENVIRONMENT", Application No. 62/056,445, filed Sep. 26, 2014; and is related to U.S. Patent Application titled "SYSTEM AND METHOD FOR SUPPORTING MULTI-TENANCY IN AN APPLICATION SERVER, CLOUD, OR OTHER ENVIRONMENT", application Ser. No. 14/601,883, filed Jan. 21, 2015; each of which above applications are herein incorporated by reference.

FIELD OF INVENTION

Embodiments of the invention are generally related to application servers and cloud environments, and are particularly related to systems and methods for providing a partition file system, and for resource overriding, in a multitenant application server environment.

BACKGROUND

Application servers generally provide a managed computing environment within which software applications can be deployed and run. Cloud-based computing environments allow applications to run within and take advantage of the distributed resources provided by a cloud. Such environments can support large numbers of users or tenants, some of which may have specific requirements that are particular to that user or tenant, for example the location of a file system, or the configuration of a particular resource. These are some examples of the type of environments in which embodiments of the present invention can be used.

SUMMARY

In accordance with an embodiment, described herein is a system and method for providing a partition file system in a multitenant application server environment. The system enables application server components to work with partition-specific files for a given partition, instead of or in addition to domain-wide counterpart files. The system also allows the location of some or all of a partition-specific storage to be specified by higher levels of the software stack. In accordance with an embodiment, also described herein is a system and method for resource overriding in a multitenant application server environment, which provides a means for administrators to customize, at a resource group level, resources that are defined in a resource group template referenced by a partition, and to override resource definitions for particular partitions.

DETAILED DESCRIPTION

In accordance with an embodiment, described herein is a system and method for providing a partition file system in a multitenant application server environment. The system enables application server components to work with partition-specific files for a given partition, instead of or in addition to domain-wide counterpart files. The system also allows the location of some or all of a partition-specific storage to be specified by higher levels of the software stack.

In accordance with an embodiment, also described herein is a system and method for resource overriding in a multitenant application server environment, which provides a means for administrators to customize, at a resource group level, resources that are defined in a resource group template referenced by a partition, and to override resource definitions for particular partitions.

Application Server (e.g., Multi-Tenant, MT) Environment

Figure 1:
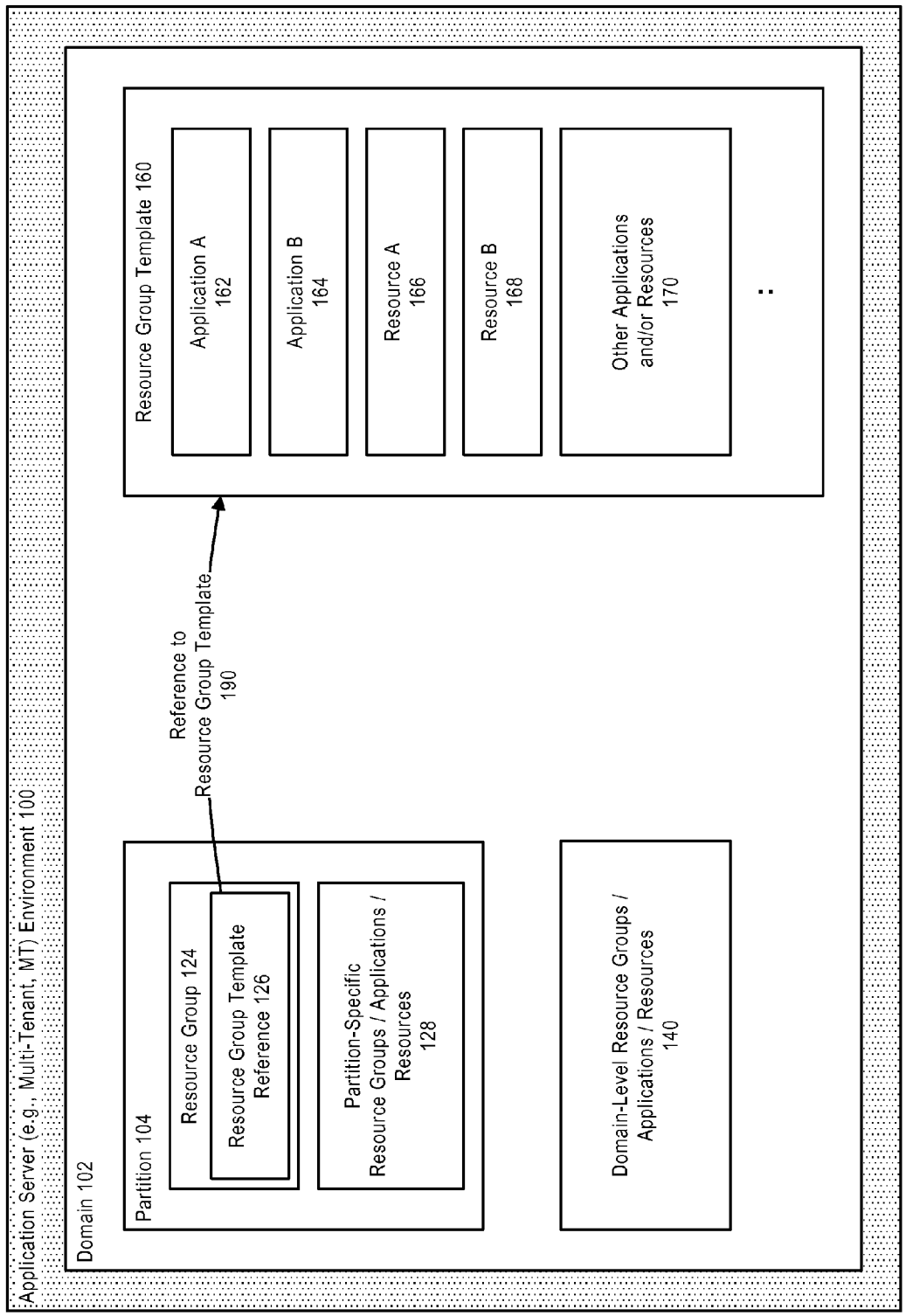
FIG. 1 illustrates a multitenant application server environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
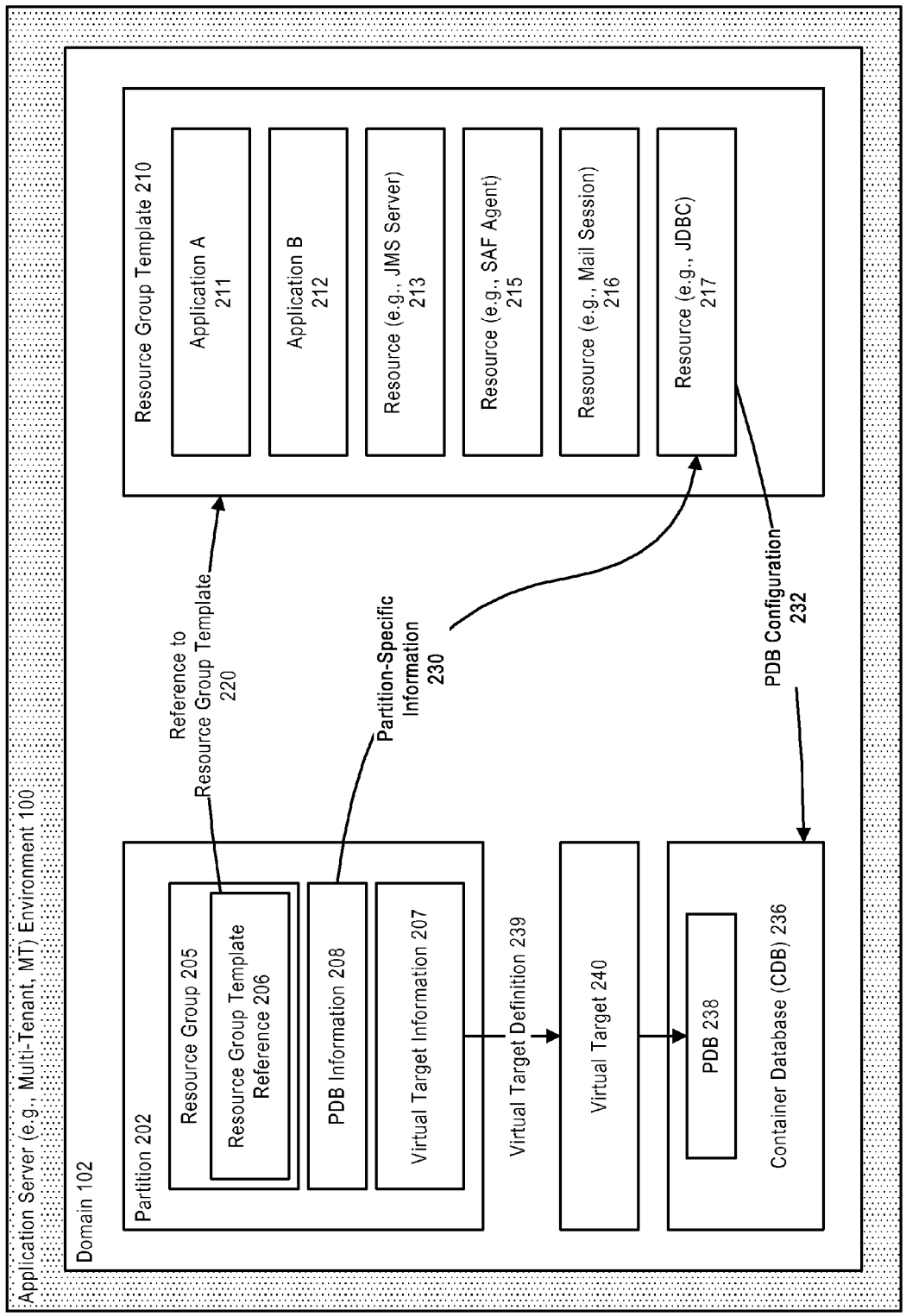
FIG. 2 further illustrates a multitenant application server environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
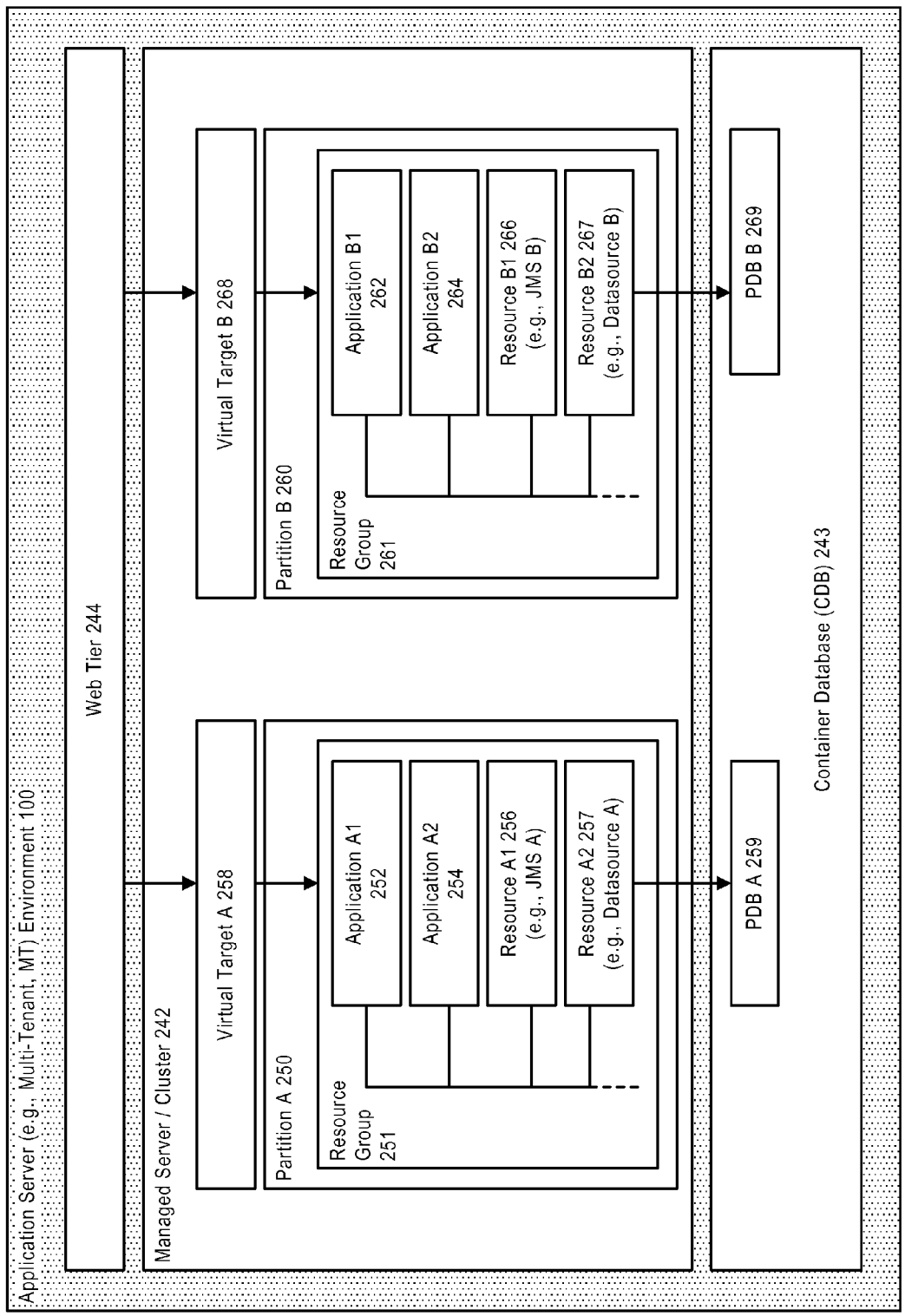
FIG. 3 further illustrates a multitenant application server environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WebLogic Diagnostics Framework (WLDF), data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
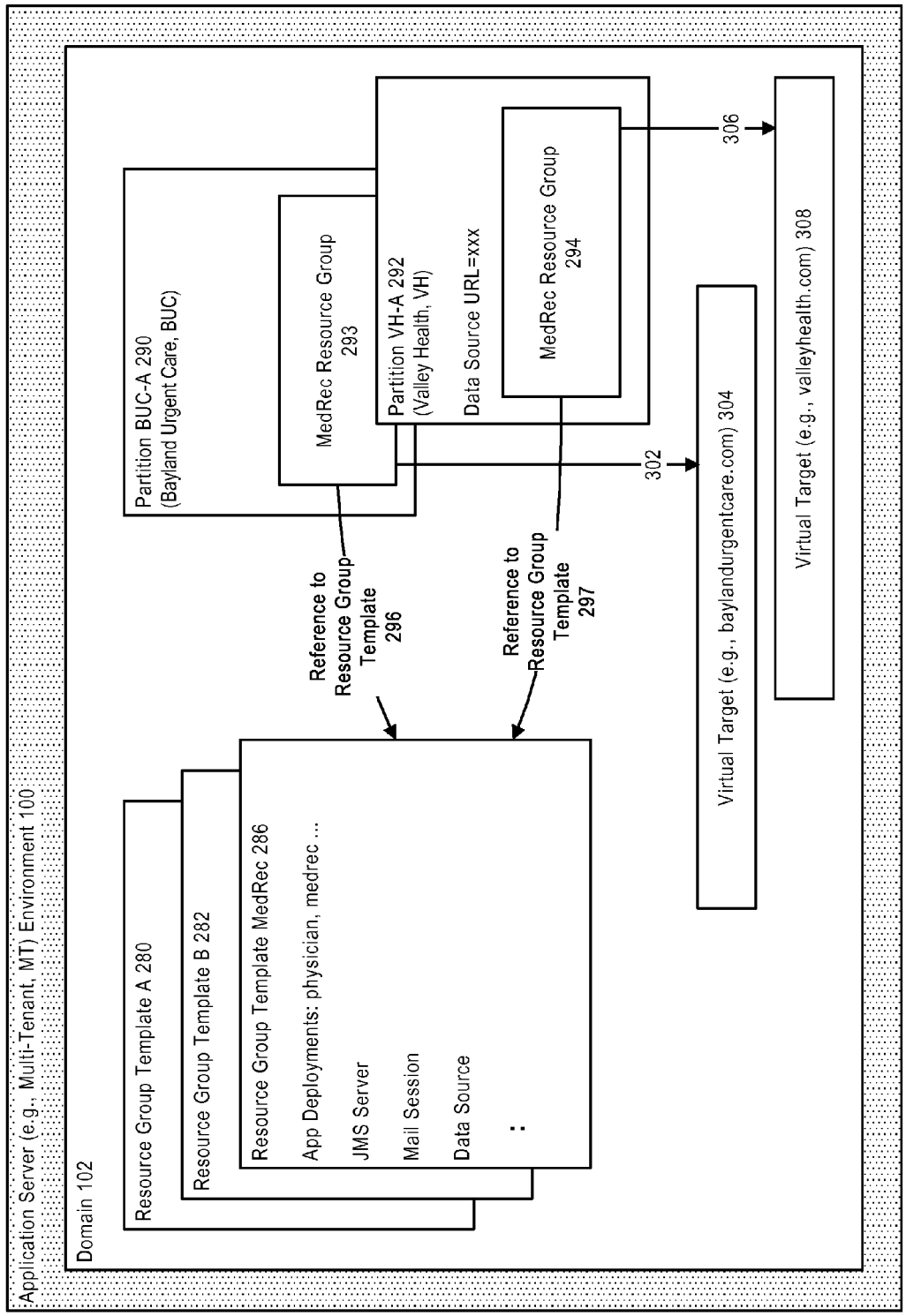
FIG. 4 further illustrates a multitenant application server environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
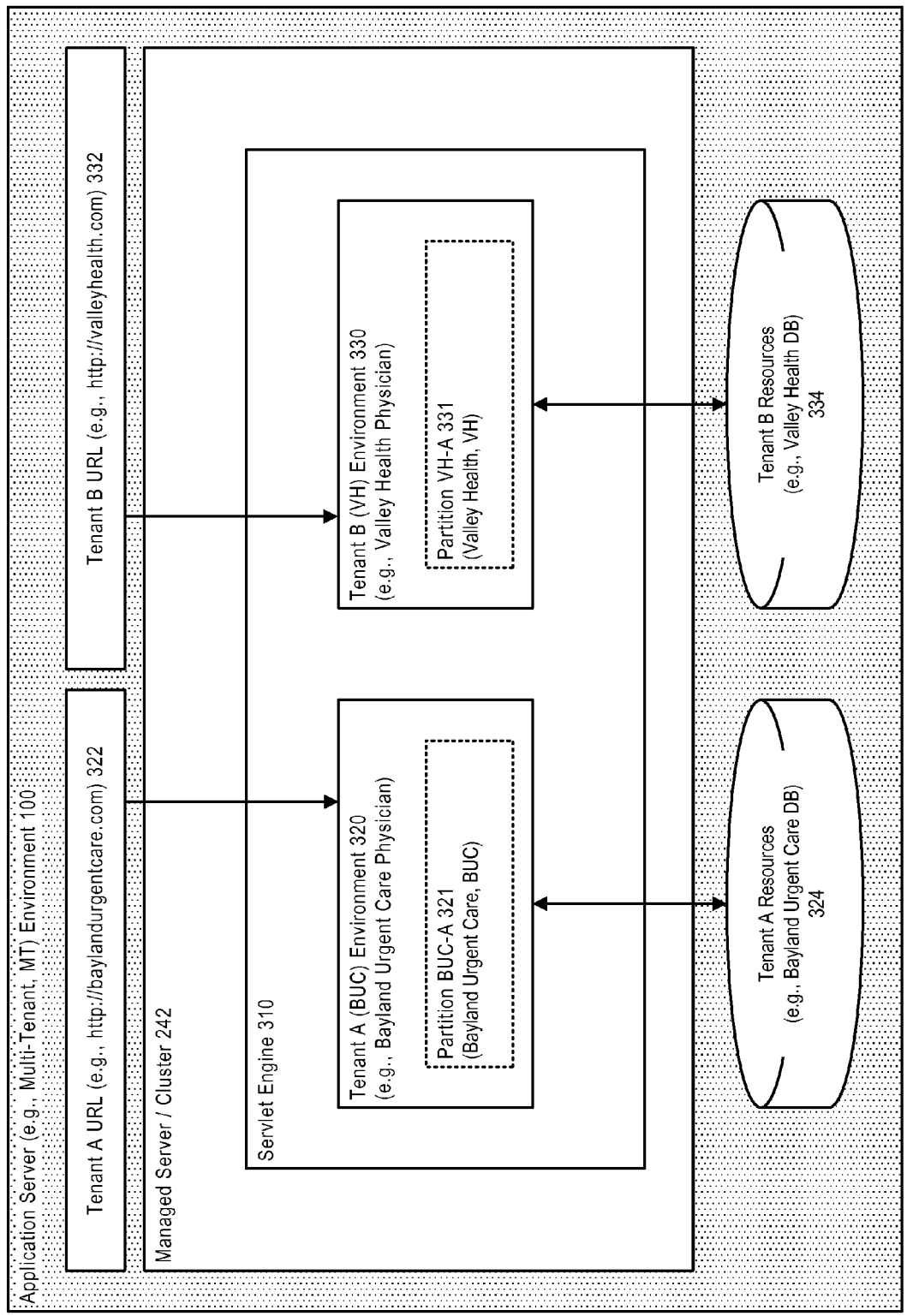
FIG. 5 further illustrates a multitenant application server environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Partition File System

In accordance with an embodiment, described herein is a system and method for providing a partition file system in a multitenant application server environment. The system enables application server components to work with partition-specific files for a given partition, instead of or in addition to domain-wide counterpart files. The system also allows the location of some or all of a partition-specific storage to be specified by higher levels of the software stack.

Introduction

In accordance with various embodiments, the following terms are used herein:

Partition file system (PFS): a file system for a partition which maps to physical storage and provides a simple way for application server (e.g., WLS) or other components to work with partition-specific files.

Partition-specific file: a file that is associated with (typically) one partition.

Runtime file system: either the current partition's file system (if there is a current partition) or, otherwise, the domain-level file system.

In a typical application server environment which supports the use of a domain, and software components which participate in the domain and store files as part of their execution process, the use of a file system generally enables those components to find their files where they expect them.

In a multitenant application server environment which recognizes the use of partitions, some software components may need to store different versions of their files for use with different partitions.

Higher level or upper-stack software components, such as Oracle Fusion Middleware (FMW) or Fusion Application (FA) components, or components of the application server itself, may need to work with partition-specific files for a given partition, instead of or in addition to domain-wide counterpart files (e.g., through the use of a lib directory).

For example, a first partition and a second partition may each require the use of files associated with a JMS message queue content, but these files may need to be stored in different locations for use by those different partitions.

As another example, when a tenant is on-boarded to a multitenant application server environment, an upper-stack component may need to allocate a partition-specific/tenant-specific storage, within which it can store partition-specific files for use with that tenant's partition.

Generally, upper-stack and application server components have a variety of needs for accessing files, such as for example: access to domain-level files, some of which may not have partition-specific counterparts; access to a given partition's file system; and/or access to a current runtime's files, so that a component can refer either to domain-level files (if no partition context is active) or to a current partition file system.

In a multitenant partition-aware environment, it can be advantageous to provide file system support which does not require changes to their existing component code, since this allows components to continue to look in familiar locations, and use familiar APIs.

It can also be advantageous to allow the upper-stack and/or an administrator, to direct where the partition-specific storage for each partition should reside, and in the absence of some directive, use a default for each partition. This allows an administrator to dictate where in a native file system any partition-specific files should reside, and configure each partition so that its file root is mapped to a specific physical location. As described herein, the term administrator generally refers to the use of upper-stack components or other software components, in addition to human administrators.

Figure 6:
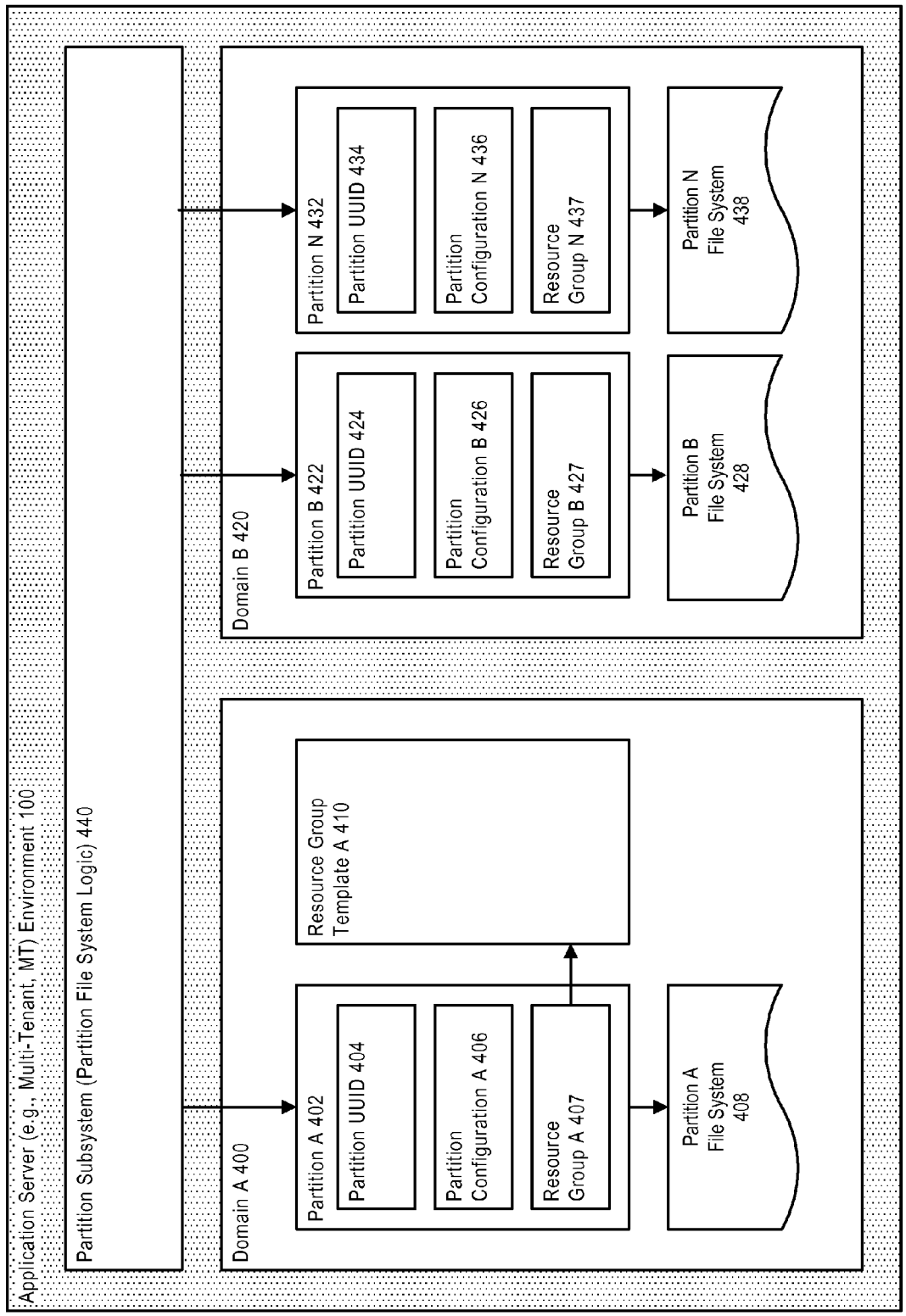
FIG. 6 illustrates use of a partition file system in a multitenant application server environment, in accordance with an embodiment.

FIG. 6 illustrates use of a partition file system in a multitenant application server environment, in accordance with an embodiment.

As illustrated in FIG. 6, in accordance with an embodiment, a first domain, here indicated as domain A 400, can include a partition A 402 with a partition universally unique identifier (UUID) 404, a partition configuration A 406, and, in this example, a resource group A 407 that references a resource group template 410. The partition can be associated with a partition A file system 408.

Similarly, in the example illustrated in FIG. 6, a second domain, here indicated as domain B 420, can similarly include a plurality of partitions B 422 and N 432, with partition UUIDs 424, 434, partition configurations 426, 436, and resource groups 427, 437, each of which can be similarly associated with their own partition file systems 428, 438 respectively.

In accordance with an embedment, a partition subsystem 440, acting as a partition file system logic, is responsible for tracking and managing the partition lifecycle and associated file systems. Typical use cases can include, when a partition is created, the application server being able to determine if a partition file system is already present, and if not to create one just-in-time. When a partition is shut down and restarted, the application server can determine if an existing partition file system is still available and if so reuse it. Other use cases include an upper-stack and/or an administrator being able to determine where a partition file system should be created within the system, and subsequently controlling its management.

In accordance with an embodiment, a partition file system can be provided as a set of navigable folders, for example as a folder hierarchy, in a similar manner for a partition environment as one might use for a domain in a traditional application server environment.

As described above, partitions can include resource groups targeted to other servers or clusters. In accordance with an embodiment, a partition file system can be stored on one managed server, or on shared servers, for example using NFS so that it can be accessed by other various other managed servers.

As also described above, partitions and their file systems have lifecycles associated therewith, which can be controlled by the partition subsystem. In accordance with an embodiment, the system requires that, before any partition is considered to be up and running, the file system for that partition must have been created and populated, for example according to any of the use cases described above. During a start of a partition, the partition subsystem can perform a check to determine if a file system already exists, and if not can further determine if the administrator has allowed the application server to create the file system on demand, and if so then proceed to create the file system.

Figure 7:
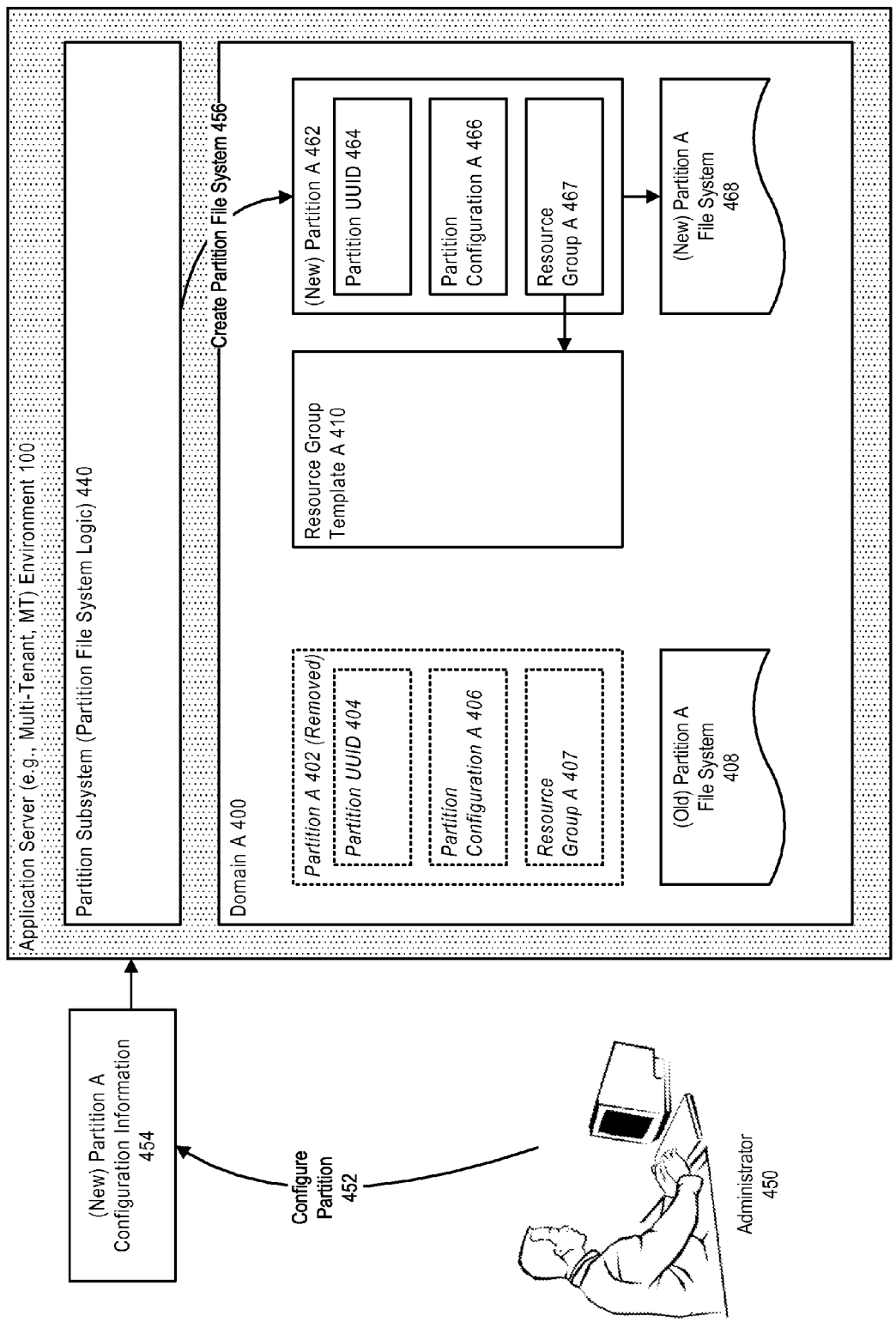
FIG. 7 further illustrates use of a partition file system in a multitenant application server environment, in accordance with an embodiment.

FIG. 7 further illustrates use of a partition file system in a multitenant application server environment, in accordance with an embodiment.

As illustrated in FIG. 7, in accordance with an embodiment, within a particular domain, an administrator 450, or an upper-stack or other component, can configure 452 a partition including in this example providing a new partition A configuration 454. (In the figure, the original partition A has been removed but is indicated herein in dashed lines for purposes of illustration).

In accordance with an embodiment, in response, a new partition file system can be created 456 for the (new) partition A 462, having a different partition UUID 464, a partition configuration 466 and resource group 467 that references the resource group template, and a (new) partition file system 468.

Although in the example illustrated, the (old) Partition A file system has been preserved, which as described in further detail below can provide some benefits, in accordance with other embodiments the system can be configured to remove any (old) file system when its associated partition is removed.

As described above, in accordance with an embodiment, each partition has a name and a UUID which uniquely identifies that partition. In accordance with an embodiment, when the system creates a file system for a partition, it also creates an marker file that holds that partition's UUID. At any later point in time, the contents of the marker file can be used to verify that the UUID in the file matches the UUID stored, e.g., in a config.xml file for that partition.

This provides advantages in ensuring that a partition can only access those file systems for which it is entitled. For example, if a partition A is removed, but for some reason (including the preservation option described below) its files system is not completely purged, then if a new partition is later created with the same name (i.e., partition A), the system can check for a preexisting directory structure and marker file, and ensure that it does not reuse the (old) partition A's file system with the new partition A having the same name. When such a mismatch is detected, the system can act accordingly, for example by not bringing the partition up until an administrator intervenes and a suitable correction has been made.

Similarly, as described above, in accordance with an embodiment, when a partition is created, the application server can determine if a partition file system is not present and create it just-in-time. In such instances, a similar sanity check can be performed to ensure that the newly configured partition UUID is the same as that stored in its file system.

As noted above, the above approach can also be used to preserve a partition file system. For example, a partition's file system may include messages associated with a JMS queue that are potentially useful, and an administrator may wish to retain the data in that file system, and rename it so it can be reviewed at a later time. In such instances, the UUID can be used to ensure that there is no conflict between the preserved file system, and a newer partition's file system, so that the data from the preserved file system can be harvested at a later point in time.

Figure 8:
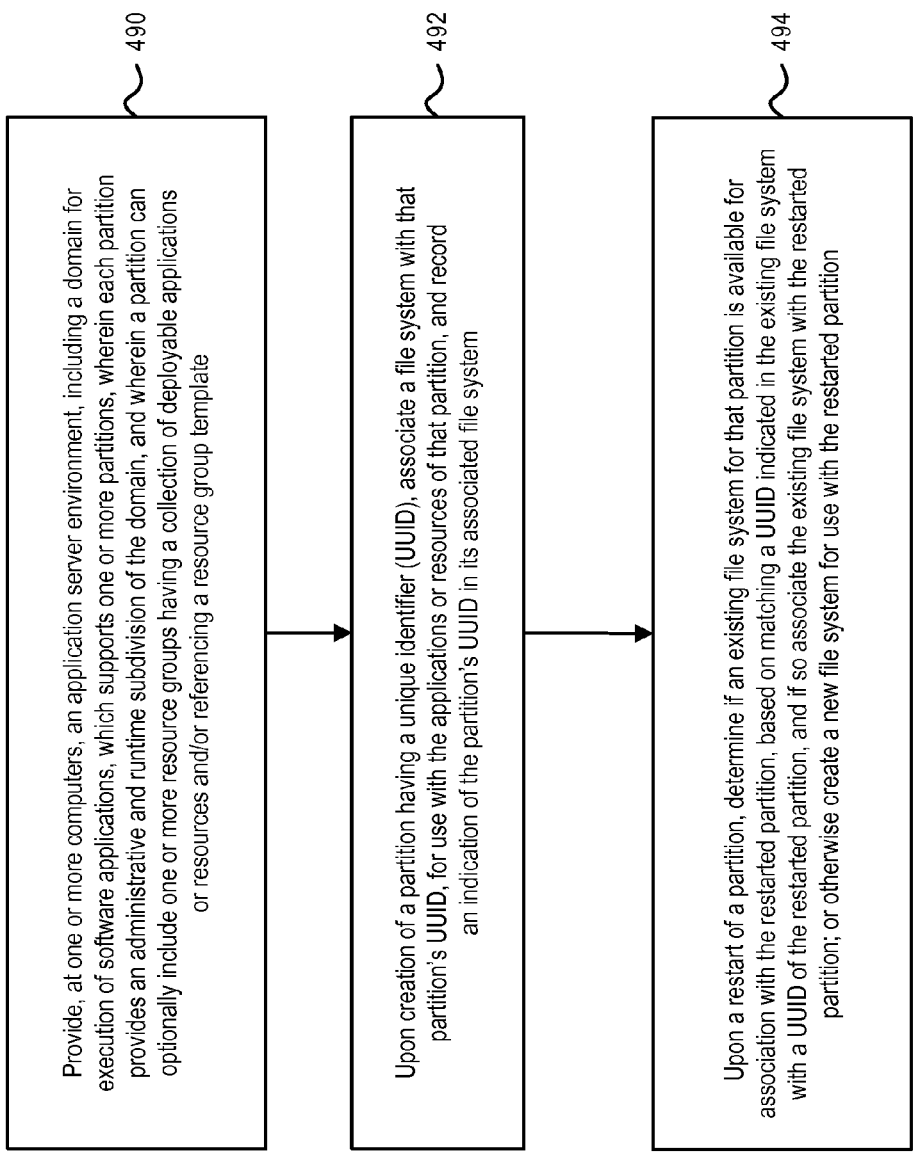
FIG. 8 illustrates a flowchart of method for supporting a partition file system in a multitenant application server environment, in accordance with an embodiment.

FIG. 8 illustrates a flowchart of method for supporting a partition file system in a multitenant application server environment, in accordance with an embodiment.

As illustrated in FIG. 8, in accordance with an embodiment, at step 490, an application server environment is provided at one or more computers, including a domain for execution of software applications, which supports one or more partitions, wherein each partition provides an administrative and runtime subdivision of the domain, and wherein a partition can optionally include one or more resource groups having a collection of deployable applications or resources and/or referencing a resource group template.

At step 492, upon creation of a partition having a unique identifier (UUID), the system associates a file system with that partition's UUID, for use with the applications or resources of that partition, and records an indication of the partition's UUID in its associated file system.

At step 494, upon a restart of a partition, the system determines if an existing file system for that partition is available for association with the restarted partition, based on matching a UUID indicated in the existing file system with a UUID of the restarted partition, and if so associates the existing file system with the restarted partition; or otherwise creates a new file system for use with the restarted partition.

Exemplary Embodiment

An exemplary embodiment is described below, which describes the use of partition file systems in the context of a WebLogic (WLS) multitenant application server environment, and which allows upper-stack components and/or an, e.g., WLS administrator, to dictate where partition-specific storage for each partition should reside. In accordance with other embodiments, similar functionality can be provided for use in other types of multitenant application server or other computing environments.

Configuration of Partition File System Root

In accordance with an embodiment, an e.g., WLS administrator, can dictate where in a native file system the partition-specific files are to reside, separately for each partition. Without direction otherwise, the application server (e.g., WLS) will create the partition-specific file storage itself and configure the partition to point to it. An administrator can configure each partition so that its file root is mapped to a specific physical location, and can configure multiple partitions to share the same file location. This is useful, for example, in a PaaS environment with an enterprise having multiple departments; or in a SaaS environment among several partitions of the same tenant. Each component should either avoid concurrent file access (for example, by including the partition name into file paths or names), or handle any concurrent access by multiple partitions to the same files.

Preservation of Deleted Partition's Files

As described above, in some instances, components may create partition-specific files that should be kept, even after the partition is deleted. In accordance with an embodiment, the system allows an administrator, at partition-deletion time, the option of preserving the partition's directory, in which case the system will rename the directory in a way that does not conflict with a possible reuse of the same partition name by a new partition.

Component-Specific Partition File System Clean-up

In accordance with an embodiment, components that create partition-specific files that should not be preserved when the partition is deleted, can clean up those files so they are not kept.

Association between Partition File System and Partition

In accordance with an embodiment, because partition names can be reused, the system can include verification that the file system for a named partition is also the file system for the partition as configured in config.xml.

Partition File System Location

In accordance with an embodiment, an administrator can control where the partition's system files will be, for example with the default being:

domain-dir/partitions/partition-name/system

Generally, the system/ directory can be used for a partition in a similar fashion as the domain-dir/ directory is used for the domain. Just as the domain-dir/ can be shared across servers (using, e.g., NFS) so too can the partition's system/ directories if the administrator sets the system up that way. The system can support the use of separate files for separate servers in partitioned environments, by allowing those server-specific directories to be below the partition's system/ directory, just as they are below the domain's domain-dir/ directory. An administrator can indicate the default root for the partition file system by specifying the empty string for the root path, which controls whether to create the directory or not. If the administrator does not specify that the system should create the directory just-in-time (during partition start-up) then the system will require that it already exists at partition start-up. If the system is unable to create the specified file system just-in-time (if so requested), or if just-in-time is not set and the configured directory does not exist, then an error will be returned.

Lifecycle of Directories in Partition File Systems

In some use cases, the configuration of a partition's file system might occur off-line, or otherwise at a time when the physical file system that will host the partition's file system is unavailable. The actual creation of the files could similarly occur later, for example during a staging step after a domain and its partitions have been configured but before they are started.

As described above, in accordance with an embodiment, the system can create a partition's file system directories just-in-time during partition start-up if they do not already exist. This ensures that the directories will be created at a time when the physical file system is available to the application server but before any components might need to use the directories.

In accordance with an embodiment, the just-in-time creation can include creating a mirror of the domain's directory structure, for example by replicating the domain directory structure under each partition's system area.

In accordance with an embodiment, as part of initializing the partition's file system, the system can write a marker file with a known name, containing the partition's UUID. During initialization, if a file is already present the system will make sure the UUID inside matches the partition's configured UUID and abort the initialization if they do not match.

Partition Start/Restart

In accordance with an embodiment, when a partition starts, the application server can use a logic similar to, for example:

```
PartitionFileSystemMBean pfs = partition.getSystemFileSystem( );
if (pfs.getRoot( ).exists( )) {
    if (partition's UUID file exists) {
        if (partition.getID( ) does not match contents of the UUID file) {
            abort the partition start-up;
        }
    } else {
        // Assume this is the first-time start with a pre-created directory.
        create the UUID file in the top-level directory and
        populate it with partition.getID( );
    }
} else {
    if ( ! pfs.isCreateOnDemand( )) {
        abort partition start-up;
        // configured directory does not exist but WLS is not to create it
    } else {
        create the partition's directory tree at the configured pfs.getRoot( );
        create the UUID file in the top-level directory there and
        populate it with partition.getID( );
    }
}
```

A successful start of a partition implies the post-condition that the partition's file system is in place, and that the UUID file exists, and its contents matches the partition's ID. This helps guard against accidental reuse of a partition file system by a later partition having the same name as an earlier partition.

Partition File System Destruction

Removal of the physical directories for a partition may happen outside the life cycle of the partition itself. For example, a JMS component may persist some data that survives the removal of the corresponding JMS resource. As a result, a partition's directories may need to outlive the partition itself.

In accordance with an embodiment, the administrator can configure a partition's file system to be preserved at partition deletion. This can be set during partition creation, or at any time afterward until the partition is deleted. Components that use partition-specific files can register a BeanUpdateListener on the DomainMBean so as to be involved in the partition deletion process. When the administrator destroys a partition, the system will invoke each component's BeanUpdateListener which, during the activateChanges phase, deletes any component-specific files it created for the partition that should never be preserved. The components can leave in-place any files that should be preserved if the partition is configured to preserve its file system.

After each component has completed its clean-up, if the administrator has requested that the partition file system be preserved, the system will rename the partition file system root from its current name, to its current name with the partition's UUID appended, with a prefix the same as the original name, while making sure it is unique and cannot be mistaken for the file system of a new partition of the same name; otherwise the system will remove the partition file system from the disk.

Partition Migration/Import/Export

In accordance with an embodiment, during migration, import or export of a partition, the administrator may need to revisit the settings for the partition's file system root. Import features will need to rewrite the marker file that contains the partition ID with the new ID generated upon import.

Interaction with FileStore

In accordance with an embodiment, the system permits administrators to create named file stores for use by, e.g., JMS servers, store-and-forward agents, and path services, at the domain level and in resource group templates and resource groups. If an administrator creates a file store in a resource group template or resource group using an absolute path, then the system will use that value. If the administrator uses a relative path, then the system will resolve that path against the current runtime's file system.

Resource Overriding

In accordance with an embodiment, also described herein is a system and method for resource overriding in a multi-tenant application server environment, which provides a means for administrators to customize, at a resource group level, resources that are defined in a resource group template referenced by a partition, and to override resource definitions for particular partitions.

Introduction

In accordance with various embodiments, the following terms are used herein:

Overriding config bean: a config bean which exposes a subset of attributes of an existing resource config bean, including that any attribute set on an instance of an overriding config bean will replace the value of that attribute in the corresponding resource config bean instance.

Resource deployment plan: an XML or other file, similar to an application deployment plan, but which identifies resources within a partition and overrides attribute settings on those resources.

As described above, in accordance with an embodiment, multi-tenancy permits deployable resources to be defined in resource group templates. Particularly in multi-tenant SaaS situations, a single template might be referenced from multiple domain partitions.

However, some attributes of resources defined in a shared template might not be correct for all—or even any—of the individual partitions that refer to the template.

Accordingly, in accordance with an embodiment, the system provides a means for upper-stack components and/or administrators (again, both of which are generally referred to herein as administrators) to customize, at the resource group level, resources that are defined in resource group templates, and/or to override resource definitions, for example using strongly-typed, administrator-friendly customization of selected attributes for frequently-customized types of resources; or more generic, power-admin-friendly approaches.

Figure 9:
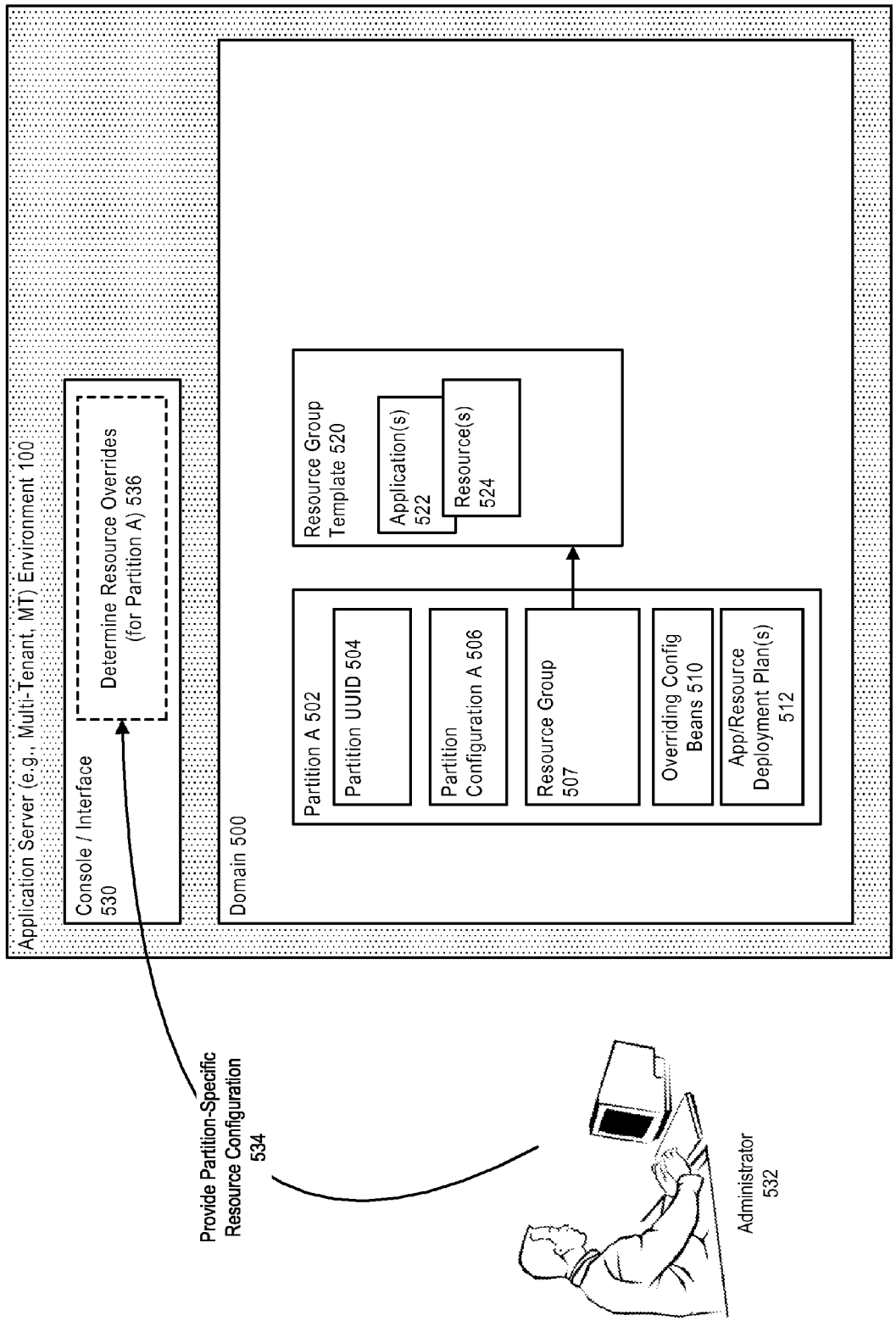
FIG. 9 illustrates resource overriding in a multitenant application server environment, in accordance with an embodiment.

FIG. 9 illustrates resource overriding in a multitenant application server environment, in accordance with an embodiment.

As illustrated in FIG. 9, in accordance with an embodiment, a domain 500 can include one or more partitions, here indicated as a partition A 502 with a partition UUID 504, a partition configuration A 506, and, in this example, a resource group 507 that references a resource group template 520 that define one or more applications 522 or resources 524. The partition can be associated with one or more overriding management components such as, for example, config beans 510, or application or resource deployment plan(s) 512.

In accordance with an embodiment, a console or interface 530 allows an administrator 532 or another component or automated process to provide partition-specific resource configuration information 534, which allows the system to determine possible resource overrides for that partition (in this example, partition A) 536.

Resource overriding is useful in various aspects of the system, such as with the partition file system functionality as described above. The general methodology underlying J2EE applications is to be able to write a software application once and use standard configuration aspects, and for an administrator to then fine-tune that application so it runs, for example, within different domains. For example, a same application deployed to two different domains may end up with two different disk storage settings.

In a multitenant environment, resource overriding similarly allows the administrator to deploy a software application once, but to then fine-tune its configuration on a partition-by-partition basis. Using the above example, this means that a same application executing in two different partitions can be configured using resource overrides to use different parts of the disk storage for its file system.

In accordance with an embodiment, the system supports a means of overriding application settings using an application deployment plan that overwrites the application deployment descriptor. A different application deployment plan can be specified for different applications executing in different partitions.

For example, as described above, an application can be deployed to a resource group template. Each of a first and second partition can include a resource group that refers to that resource group template, for purposes of installing and configuring the application. The application, when deployed to a first partition, can use a first application deployment plan, and when deployed to the second partition can use a second application deployment plan, which provides the desired fine-tuning of the application configuration between the two partitions.

As described herein, an application deployment plan contrasts with a resource deployment plan in that the former can be used to specify overrides or characteristics of an application; while the latter can be used to specify overrides or characteristics of the resources defined by a resource group template for use with the application's partition.

For example, the use of a database resource by an application can be defined in a resource group template, including the use of, e.g., a specific URL, username and password to access the database. Since these attributes may be different for different partitions, the use of resource overriding in general allows the system to change the behavior of, in this example, a JDBC resource, for use by the different partitions to allow those partitions and their applications to connect differently to the database.

Figure 10:
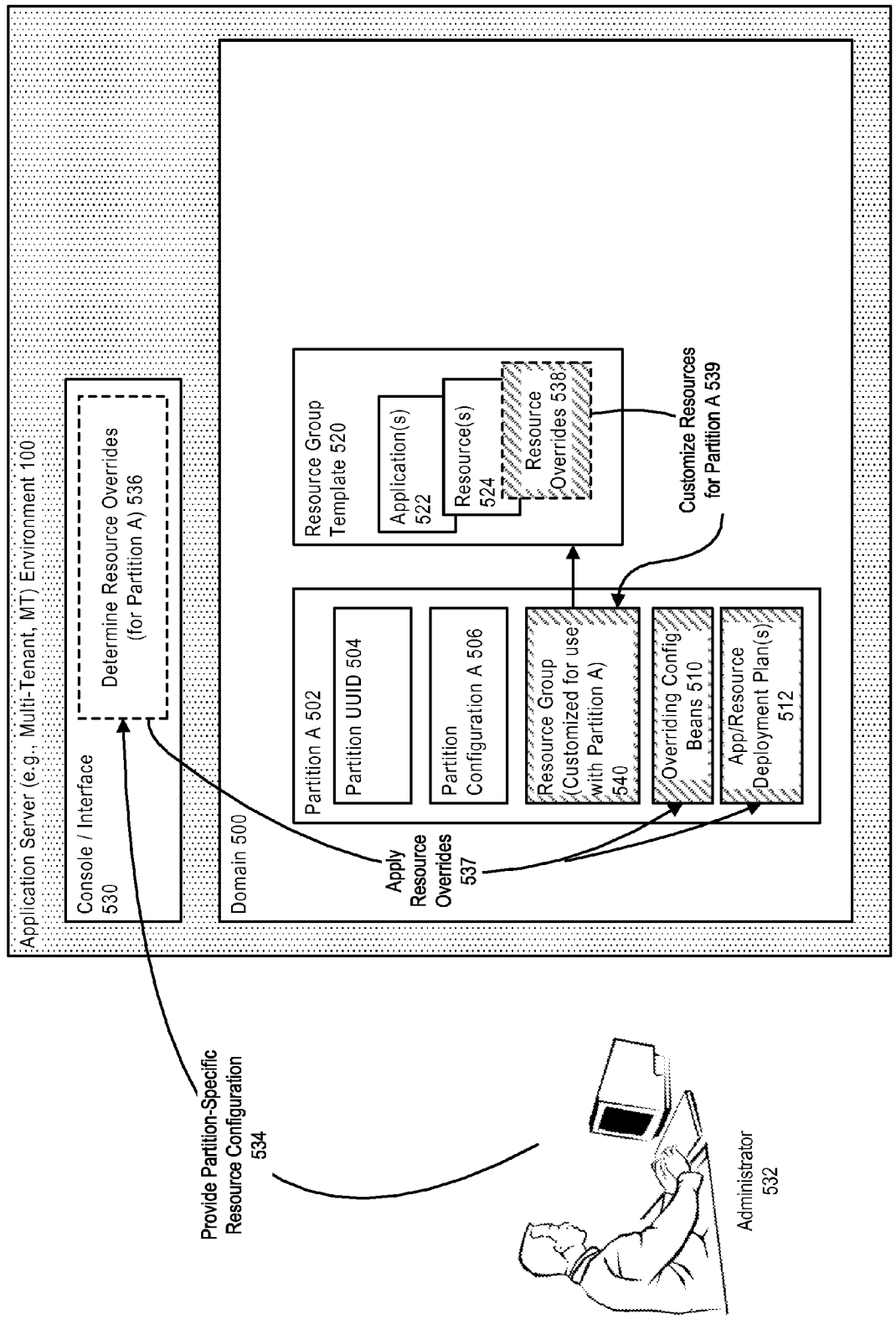
FIG. 10 further illustrates resource overriding in a multitenant application server environment, in accordance with an embodiment.

FIG. 10 further illustrates resource overriding in a multitenant application server environment, in accordance with an embodiment.

As shown in FIG. 10, in accordance with an embodiment, resource overrides are applied 537 to one or more of the overriding config beans or application or resource deployment plan(s) to create resource overrides 538 for use with the resource group template in customizing 539 the resources defined by the template and referenced by the resource group, for the partition A 540.

Figure 11:
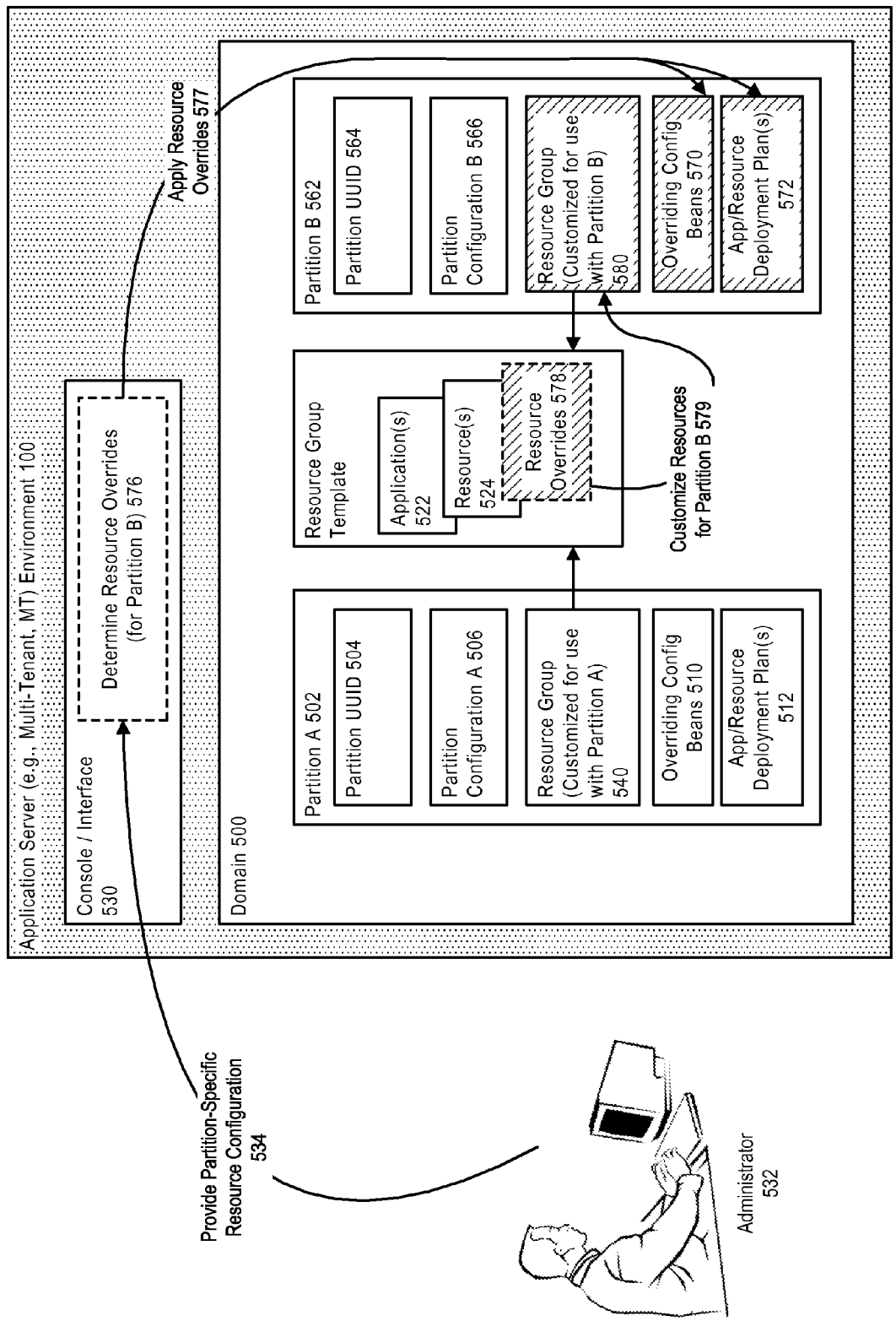
FIG. 11 further illustrates resource overriding in a multitenant application server environment, in accordance with an embodiment.

FIG. 11 further illustrates resource overriding in a multitenant application server environment, in accordance with an embodiment.

As illustrated in FIG. 11, in accordance with an embodiment, the domain can include an additional partition, here indicated as partition B 562 with a partition UUID 564, a partition configuration B 566, and, in this example, a resource group that references the same resource group template, and wherein the partition can be associated with one or more overriding config beans 570, or application or resource deployment plan(s) 572.

In accordance with an embodiment, a similar technique can be applied to partition B, so that resource overrides are applied 577 to one or more of the overriding config beans or application or resource deployment plan(s), to create resource overrides 578 for use with the resource group template in customizing 579 the resources defined by the template and referenced by the resource group, for the partition B 580.

As described above, in accordance with an embodiment, a partition can be associated with one or more overriding config beans, or application or resource deployment plan(s). Generally, the overriding config beans are used to provide a collection of overridable attributes, for example for a JDBC resource, or a JNDI provider. An administrator can configure or override a behavior in a resource defined in a resource group template, for example using a console or an WebLogic Scripting Tool (WLST) script or REST to access the config bean and override the, e.g., data source attributes. As described above, overriding config beans are specified at the partition level.

A resource deployment plan can then be generally used to specify overrides for resources at a lower level that may not be readily accessible or exposed using the overriding config beans.

The opportunity to define and override resource attributes, rather than initially leave them undefined and later define them, becomes more evident in SaaS use cases. For example when different tenants (e.g., companies), each with their own partition, wish to use a particular application and resources in a SaaS environment, the system can use the same resource group template to configure the application and resource for deployment, while still being able to override settings for the different partitions. This makes overriding a more efficient process, and allows an application to be developed and deployed once within a particular environment, and then used for different partitions with appropriate overrides.

Figure 12:
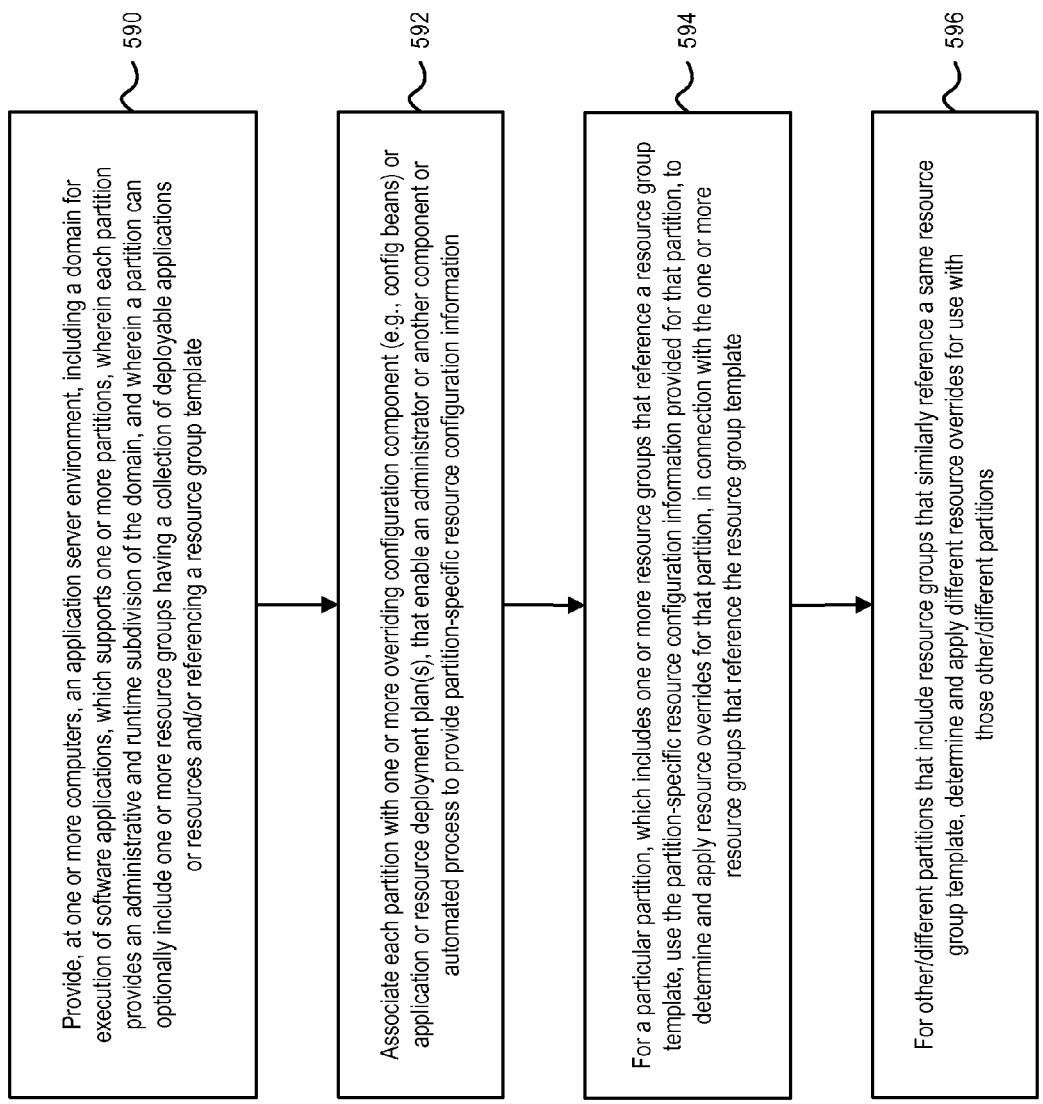
FIG. 12 illustrates a flowchart of method for supporting resource overriding in a multitenant application server environment, in accordance with an embodiment.

FIG. 12 illustrates a flowchart of method for supporting resource overriding in a multitenant application server environment, in accordance with an embodiment.

As illustrated in FIG. 12, in accordance with an embodiment, at step 590, an application server environment is again provided at one or more computers, including a domain for execution of software applications, which supports one or more partitions, wherein each partition provides an administrative and runtime subdivision of the domain, and wherein a partition can optionally include one or more resource groups having a collection of deployable applications or resources and/or referencing a resource group template.

At step 592, each partition can be associated with one or more overriding configuration component (e.g., config beans) or application or resource deployment plan(s), that enable an administrator or another component or automated process to provide partition-specific resource configuration information.

At step 594, for a particular partition, which includes one or more resource groups that reference a resource group template, the system uses the partition-specific resource configuration information provided for that partition, to determine and apply resource overrides for that partition, in connection with the one or more resource groups that reference the resource group template.

At step 596, for other/different partitions that include resource groups that similarly reference a same resource group template, the system can determine and apply different resource overrides for use with those other/different partitions.

Exemplary Embodiment

An exemplary embodiment is described below, which describes the use of resource overriding in the context of a WebLogic (WLS) multitenant application server environment. In accordance with other embodiments, similar functionality can be provided for use in other types of multi-tenant application server or other computing environments.

In accordance with an embodiment, a generic, power-admin-friendly approach, which expands application deployment plan support, can be used to support the use of a resource deployment plan which works with resources, such as, for example, JDBC, JMS, Oracle Coherence, WebLogic Diagnostics Framework (WLDF), or other resources or components.

A first technique follows the example of partition PDBs described above, including that a subset of data source attributes can be exposed as a config bean class, which is then accessible by conventional methods such as WLST or an administrator-friendly console panel.

An alternate technique extends existing models for customizing applications and application-scoped resources using deployment plans, applying the same approach to resources, which can then be used to override the settings for resources that are defined in a resource group template, or to override settings for resources defined directly in the resource groups of a partition.

Another technique takes advantage of existing application deployment plan features, by allowing an administrator to specify a partition-specific application deployment plan for each application deployment in the partition.

Yet another technique includes processing macros used in string-typed attributes in the config.xml file associated with a partition.

In accordance with an embodiment, an application server, e.g., WLS, gathers the configuration of a particular resource from a variety of sources, depending on the type of resource, for example a config.xml definition of the resource, and an external descriptor for the resource.

For frequently-customized resource types (e.g., data sources and JMS resources), the system can expose an overriding config bean that overrides configuration stored in either the config.xml file or the resource's external descriptor.

For less-frequently customized data, the system can allow an administrator to specify a resource deployment plan at the partition level that overrides editable attributes of a resource within the partition.

In accordance with an embodiment, overriding config beans can be provided as children of a partition management bean (e.g., PartitionMBean). Their attributes can override values from config.xml or from the resource's external descriptor. Component developers do not need to do anything to enable or support resource deployment plans; but can identify which attributes (if any) of which resources should be exposed to administrators for attributes or settings which are easily customized, so that the console will expose them in an administrator-friendly way and WLST scripts can refer directly to the exposed, strongly-typed and strongly-named attributes. For each resource type exposed this way, the logic which starts up a resource can be configured to look for and use any corresponding overriding config bean.

Overriding Config Beans as Children of PartitionMBean.

In accordance with an embodiment, overriding config beans follow the naming convention xxxOverrideMBean, where xxx is the prefix of the resource MBean class that is a child of ResourceGroupMBean being overridden (e.g., JMSSystemResourceOverrideMBean), which emphasizes the role of the overriding config bean and associates it clearly with the bean whose settings it overrides. The component code matches each overriding config bean instance with the config bean to be overridden.

For example, a data source component code will match up the JDBCSystemResourceOverrideMBean instance having data-source-name "foo" with the resource group template's JDBCSystemResourceMBean instance having that same data source name "foo." An attribute in such overriding config beans can be used to override the config.xml settings for the resource, or to override a setting from the resource's external descriptor, depending on where the frequently-customized setting actually resides. Since each component implementation has full knowledge of the configuration information of the resource, it can apply the fields in the overriding config bean in an appropriate manner.

Resource Deployment Plans

In accordance with an embodiment, each partition can have at most one resource deployment plan which can override any resources in that partition. Some examples of resources available for overriding via resource deployment plans include CoherenceClusterSystemResource, FileStore, ForeignJNDIProvider, JDBCStore, JDBCSystemResource, JMSBridgeDestination, JMSServer, JMSSystemResource, MailSession, Managed ExecutorService, ManagedScheduledExecutorService, ManagedThreadFactory, MessagingBridge, PathService, SAFAgent, or WLDFSystemResource.

In accordance with an embodiment, when a server restarts, changes to non-dynamic attributes from the resource deployment plan (and from overriding config beans) will be applied before the resource is active. Once a given resource is running, changes to the resource deployment plan that would affect non-dynamic attributes of that resource will not take effect until a restart, just as with changes to non-dynamic attributes made in any other way. In some cases, a partition restart (as opposed to a more disruptive server restart) is sufficient.

A typical application deployment plan works only for applications and application-scoped resources. Such a plan generally is provided as an XML file and contains two sections: variable definitions, each as a variable name/value pair; and module overrides, each identifying one module in the application to be modified and including variable assignments indicating the location within that module to update (each update can change, add, or remove attribute settings) using XPath-like notation, and the variable name whose defined value is to be used in place of the current value. The config subtree for the application is created in-memory from the application descriptor, its modules and their descriptors, and annotations in the application code. The configuration for the bean attribute specified by the XPath expression is then replaced in-memory by the value associated with the variable-definition/value of the variable cited in the variable-assignment.

In accordance with an embodiment, a resource deployment plan can be similarly provides as an XML file that overrides attributes for one or more resources within a single partition. This includes resources defined in resource group templates to which the partition's resource groups refer, in addition to resources declared directly in the resource groups. An exemplary syntax can be:

---

```
resource-deployment-plan (@global-variables)
    description
    version
    variable-definition
        variable*
            name
            value
    external-resource-override*
```

-continued

```
    resource-name
    resource-type
    root-element
    descriptor-file-path
    variable-assigment*
      name
      xpath
    config-resource-override*
      resource-name
      resource-type
      variable-assigment*
        name
        xpath
        operation
```

In accordance with an embodiment, the root element is resource-deployment-plan. Each external-resource-override and config-resource-override element (and their child elements) will do three things: identify the resource to affect (resource-name and resource-type), identify where the attributes are defined, and specify some number of attributes of that resource to override (variable-assignment elements).

The resources in a partition must have unique names within the partition. In accordance with an embodiment, a type can be included primarily as an additional validation check. Suppose a partition contained a mail session foo and an administrator prepared a resource deployment plan overriding foo; and that a later update removed the mail session foo and added a data source foo. With the plan specifying the type as well as the name, the plan processor can detect the mismatch in the expected type versus the actual type of the resource.

In accordance with an embodiment, with so-called "config" resources all the attributes are in config.xml, so that once the plan processor has located the resource it implicitly knows where the attributes will be for this category of resource. The plan uses config-resource-override to denote an override of this type of resource. With "external" resources the attributes are stored in the external descriptor file. The plan processor needs to know the path to that file and the root XML element in the descriptor. For resource deployment plans the descriptor path is relative to the partition's config/ directory. The external-resource-override element identifies an override of this category of resource.

Once the plan processor knows where to find the attributes for the resource, it can apply the variable-assignments. Each XPath expression tells where, relative to the identified resource's bean, the attribute to be affected appears in the bean tree. The name refers to a previously-defined variable definition. That earlier variable also sets the value that should replace whatever is in the original attribute setting.

Applying Resource Deployment Plans

As with application deployment plans, applying a resource deployment plan does not change the contents of config.xml or any of the various resources' external descriptor files. The plans affect only the portion of the in-memory config tree passed as an argument. During server start-up and when an edit session is activated, the partition subsystem will use the plan processor to apply each partition's resource deployment plan (if any) to the partition's portion of the proposed config tree. When the proposed tree is used to update the existing runtime tree, the overrides from the resource deployment plans have all been applied and the system will run with the overridden values. The resource deployment plan resides at the partition level, as do the overriding config beans. Because all resource names within a partition must be unique, there is no ambiguity in resource references inside the resource deployment plans.

Configuring Resource Deployment Plans

In accordance with an embodiment, the PartitionMBean can include an attribute, planPath, which if set will hold the relative or absolute path to the resource deployment plan for that partition. A relative path will be resolved within the partition's system file system (also configured on the PartitionMBean). A partition is not required to have a resource deployment plan, in which case the planPath is not set.

In accordance with an embodiment, the application server supports two programming models by which admin clients can manage application deployment plans. A low-level API exposes the in-memory objects which result from parsing the plan file (the equivalent of the DOM tree). A higher-level API allows an admin client to see the in-memory bean tree for the application and its application-scoped resources, populated with values from the descriptors and modified by any existing application deployment plan. When an edit session is activated any changes made to the config beans are persisted in the application deployment plan.

In accordance with an embodiment, to help administrators who need to use resource deployment plans, a console tool can be provided that allows a user to browse the resources accessible within a partition (whether defined directly in a resource group or indirectly via a resource group's reference to a resource group template), display the current settings, allow the user to customize the resource as if s/he were defining it anew (changing values, removing settings, adding new settings), and then save all the changes in the form of a resource deployment plan. The tool can then generate only the overrides (and variable declarations) needed to record what the user actually changed.

Partition-Specific Application Deployment Plans

In accordance with an embodiment, if an application is deployed to a resource group template, the administrator can provide a partition-specific application deployment plan. As the system prepares an application deployment within a partition for execution, it applies the partition-specific application deployment plan for that application if one is specified. The changes prescribed by a partition-specific application deployment plan affect only the application deployment within that partition.

Configuring Partition-Specific Application Deployment Plans

In accordance with an embodiment, administrators can use redeploy and updateApplication commands to specify a partition-specific application deployment plan for an application. The updateApplication WLST command can include as options: resourceGroup, resourceGroupTemplate, and partition. The administrator can use these along with the appName option to identify which specific application deployment is to be modified, specifying the planPath option to point to the plan file. These partition-specific plans are specified at the resource group level within the partition, not at the partition level.

Leveraging Config Bean Delegation

In accordance with an embodiment, the system can take advantage of config bean delegation implementation. For example, if a resource group template defines an application deployment for foo and the administrator sets up a partition-specific application deployment plan for that application in partition A, then config.xml will contain this:

```
<partition>
<name>A</name>
...
<resource-group>
<name>RG1</name>
...
<app-deployment>
<name>foo</name>
<planPath>path-to-plan-file</planPath>
</app-deployment>
....
</resource-group>
</partition>
```

Because ResourceGroupMBean delegates to ResourceGroupTemplateMBean, invoking ResourceGroupMBean- .lookupAppDeployment("foo") returns a filled-out AppDeploymentMBean for application foo, with the value for PlanPath from the resource group level setting and the rest of the attributes from the definition of foo in the resource group template. This is a potential source of minor confusion because overriding config beans and resource deployment plans will be specified at the partition level, while partition-specific application deployment plans exist inside resource groups. But administrators use the redeploy or updateApplication commands, rather than direct config bean operations, to set up partition-specific application deployment plans. Unless the administrator looks at the config.xml content s/he will not see where these various artifacts actually reside.

"Stacking" of Application Deployment Plans

In accordance with an embodiment, plans will not "stack." If an application deployment plan is specified at the resource group template level and a partition-specific application deployment plan is specified for the same app, then the partition-level one is used, and the resource group template level plan is ignored.

Macro Support

In accordance with an embodiment, the system supports substitution of macros for String-typed attributes in config.xml, including its use with partitions. If a macro is used in any partition-level resource (typically by reference to a resource group template), then when the DomainMacroSubstitutor tries to resolve the macro for a clone config bean it consults these sources in order: a predefined keyword (domainName, serverName, clusterName, machineName); a ConfigurationProperty with matching name defined by the clone's partition, the domain; a Java system property. If an administrator creates a resource group template, and defines in it a resource that does not have an external descriptor, then attribute values for that resource can use macros. If the administrator defines a ConfigurationProperty with that name in each partition, then the value for the macro could be different for each partition.

Combining Techniques

Administrators can combine any of the techniques described above, and the system can apply them in an order cumulatively, for example as: config.xml and/or external descriptor as-written including partition-specific application deployment plan macros in config.xml; overriding config beans; resource deployment plan. For example, if an attribute is referenced by both a resource deployment plan and an overriding config bean, the overriding config bean takes precedence.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for resource overriding in a multitenant application server environment, comprising:
one or more computers, including an application server environment that enables deployment and execution of software applications, wherein the application server environment includes:
a domain configuration that defines an application server domain for execution of the software applications, and a plurality of partitions of the domain;
a plurality of deployable resources that can be used within the application server environment; and
one or more resource groups that enable partition-specific information to be provided for one or more of the resources;
wherein each partition of the plurality of partitions, is associated with a partition configuration, and provides a subdivision of the domain, and includes one or more of the resource groups; and
wherein each particular partition of the plurality of partitions can be associated with at least one of a partition-specific resource configuration information or application deployment plan that enables the application server environment to configure resource overrides for the particular partition, to customize, at the resource group level, the one or more resources to be used with the particular partition, and to configure an application for deployment to the particular partition.

2. The system of claim 1, wherein the system enables use of at least one of application deployment plans or resource deployment plans, to configure the resource overrides for use with a partition.

3. The system of claim 2, wherein an application deployment plan overwrites an application deployment descriptor, including that different application deployment plans can be specified for different applications executing in different partitions.

4. The system of claim 2, wherein a resource deployment plan creates resource overrides for use with a particular resource group template in customizing resources defined by the particular resource group template, for use with a partition.

5. The system of claim 1, wherein the system enables use of overriding config beans to override resource definitions for use with a partition.

6. The system of claim 1, wherein some or all of the resource overrides are specified by upper levels in the software stack.

7. The system of claim 1, wherein each particular partition of the plurality of partitions is associated with an application deployment plan that enables the application server environment to configure the application for deployment to the particular partition in accordance with the application deployment plan for that partition.

8. A method for resource overriding in a multitenant application server environment, comprising:
   providing, at one or more computers, an application server environment that enables deployment and execution of software applications, wherein the application server environment includes:
      a domain configuration that defines an application server domain for execution of the software applications, and a plurality of partitions of the domain;
      a plurality of deployable resources that can be used within the application server environment; and
      one or more resource groups that enable partition-specific information to be provided for one or more of the resources;
      wherein each partition of the plurality of partitions, is associated with a partition configuration, and provides a subdivision of the domain, and includes one or more of the resource groups; and
   associating each particular partition of the plurality of partitions with at least one of a partition-specific resource configuration information or application deployment plan that enables the application server environment to configure resource overrides for the particular partition, to customize, at the resource group level, the one or more resources to be used with the particular partition, and to configure an application for deployment to the particular partition.

9. The method of claim 8, further enabling use of at least one of application deployment plans or resource deployment plans, to configure the resource overrides for use with a partition.

10. The method of claim 9, wherein an application deployment plan overwrites an application deployment descriptor, including that different application deployment plans can be specified for different applications executing in different partitions.

11. The method of claim 9, wherein a resource deployment plan creates resource overrides for use with a particular resource group template in customizing resources defined by the particular resource group template, for use with a partition.

12. The method of claim 8, further enabling use of overriding config beans to override resource definitions for use with a partition.

13. The method of claim 8, wherein some or all of the resource overrides are specified by upper levels in the software stack.

14. The method of claim 8, wherein each particular partition of the plurality of partitions is associated with an application deployment plan that enables the application server environment to configure the application for deployment to the particular partition in accordance with the application deployment plan for that partition.

15. A non-transitory computer readable storage medium, including instructions stored thereon which when read and executed by one or more computers cause the one or more computers to perform the steps comprising:
   providing an application server environment that enables deployment and execution of software applications, wherein the application server environment includes:
      a domain configuration that defines an application server domain for execution of the software applications, and a plurality of partitions of the domain;
      a plurality of deployable resources that can be used within the application server environment; and
      one or more resource groups that enable partition-specific information to be provided for one or more of the resources;
      wherein each partition of the plurality of partitions, is associated with a partition configuration, and provides a subdivision of the domain, and includes one or more of the resource groups; and
   associating each particular partition of the plurality of partitions with at least one of a partition-specific resource configuration information or application deployment plan that enables the application server environment to configure resource overrides for the particular partition, input to customize, at the resource group level, the one or more resources to be used with the particular partition, and to configure an application for deployment to the particular partition.

16. The non-transitory computer readable storage medium of claim 15, further enabling use of at least one of application deployment plans or resource deployment plans, to configure the resource overrides for use with a partition.

17. The non-transitory computer readable storage medium of claim 16, wherein an application deployment plan overwrites an application deployment descriptor, including that different application deployment plans can be specified for different applications executing in different partitions.

18. The non-transitory computer readable storage medium of claim 16, wherein a resource deployment plan creates resource overrides for use with a particular resource group template in customizing resources defined by the particular resource group template, for use with a partition.

19. The non-transitory computer readable storage medium of claim 15, further enabling use of overriding config beans to override resource definitions for use with a partition.

20. The non-transitory computer readable storage medium of claim 15, wherein some or all of the resource overrides are specified by upper levels in the software stack.

* * * * *

UNITED STATES PATENT AND TRADEMARK OFFICE
CERTIFICATE OF CORRECTION

PATENT NO. : 10,467,061 B2
APPLICATION NO. : 14/865923
DATED : November 5, 2019
INVENTOR(S) : Quinn et al.

Page 1 of 1

It is certified that error appears in the above-identified patent and that said Letters Patent is hereby corrected as shown below:

In the Claims

In Column 24, Line 37, in Claim 15, after "partition," delete "input".

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*